United States Patent Office 2,834,777
Patented May 13, 1958

2,834,777
METHODS OF TREATING CELLULOSE ETHERS

Elof Ingvar Jullander, Ornskoldsvik, Sweden, assignor to Mo Och Domsjö Aktiebolag, Ornskoldsvik, Sweden, a corporation of Sweden No Drawing. Application April 30, 1957
Serial No. 655,968

9 Claims. (Cl. 260—232)

The present invention relates to water-soluble cellulose ethers, and is more particularly concerned with a method of treating water-soluble cellulose ethers to provide a number of qualitative improvements of such cellulose ethers, as explained in detail below.

One object of this invention is to improve the stability of water-soluble cellulose ethers when they are stored at elevated temperatures. Comparative tests with untreated cellulose ethers and cellulose ethers treated in accordance with this invention indicate an increased resistance to degradation, as evidenced by a reduced decrease in viscosity in the latter case.

Another object of this invention is to improve the stability of alkaline aqueous solutions of water-soluble cellulose ethers. When stored for a prolonged period of time at room temperature or for a shorter period at a higher temperature, pure aqueous solutions of cellulose ethers will generally show no variation in viscosity, provided that suitable precautionary measures to avoid microbiological degradation have been taken, but in alkaline solutions a degradation will generally take place which may be prevented or at least inhibited by treatment of the cellulose ether in accordance with this invention.

A further object of this invention is to provide a whiter product.

Other objects and advantages of this invention will be apparent as the description proceeds.

The objects of this invention are achieved by subjecting the water-soluble cellulose ethers to the action of an alkali metal borohydride, preferably at a pH of 7 or above. Alkali metal borohydrides, similar to borohydrides generally, are known to be powerful but selectively acting reducing agents, which react e. g. with water to form gaseous hydrogen and reduce aldehyde groups of carbohydrates. Sodium borohydride, e. g., reacts rather slowly with pure water, but reacts rapidly with an acid solution. In alkaline aqueous solutions, on the other hand, the borohydrides are relatively stable.

It is not possible to give a full explanation of the effects observed when treating water-soluble cellulose ethers with borohydrides in accordance with this invention, but it is supposed that the ability of the borohydrides to reduce aldehyde groups may be involved.

While the following description shows mainly, how sodium borohydride can be utilized in the process of this invention, other alkali metal borohydrides are operative according to this invention. In this connection, primarily potassium borohydride and lithium borohydride are contemplated. Cesium and rubidium borohydrides are known and react in a similar manner to the other alkali metal borohydrides, but on account of the fact that these metals are difficultly available they will hardly obtain any practical importance.

Products which may be improved in quality by practicing the process of this invention are water-soluble cellulose ethers which term as used in the present specification and claims includes ethers which are soluble only in aqueous solutions of caustic alkali. A great number of such cellulose ethers are known and described in the technical literature and many are also commercially available. Ionic cellulose ethers are obtained by introducing into the cellulose molecules such groups as carboxymethyl, carboxyethyl, sulfomethyl, sulfoethyl etc. groups. Nonionic cellulose ethers are obtained by introducing e. g. methyl, ethyl, hydroxyethyl, hydroxypropyl, cyanoethyl groups. Ethers containing two or more substituents are also common and examples of such ethers include methylhydroxyethylcellulose, methylhydroxypropylcellulose, ethylhydroxyethylcellulose, methyl-ethylcellulose, methyl-carboxymethylcellulose, hydroxyethyl - carboxymethylcellulose, etc. As a general rule, a low degree of substitution (number of substituent groups per anhydroglucose unit of the cellulose molecule) affords solubility in aqueous alkali only, while a higher degree of substitution results in solubility in both aqueous alkali and water. The solubility, however, is not influenced by the degree of substitution alone, but also by the average degree of polymerization or molecular weight of the cellulose ether, in that the solubility increases slightly when the degree of polymerization is reduced. As an illustration of the difference between cellulose ethers soluble in aqueous alkali only and cellulose ethers soluble in water it may be mentioned that carboxymethylcellulose having a degree of substitution of about 0.3 is usually soluble in aqueous alkali only while a degree of substitution of 0.5 or above gives solubility in water, too. Ethyl cellulose having a degree of substitution of 0.6 to 0.8 dissolves only in aqueous alkali, but when the degree of substitution is increased to about 1.2 to 1.3 the product dissolves fairly well in water. Analogous conditions apply to methyl cellulose. For cellulose ethers containing methyl or ethyl groups, it is further to be noted that the solubility in water is reduced as the degree of substitution is increased above a certain optimum value. This is explained by the fact that ethyl and methyl groups as such have a hydrophobic character.

Some water-soluble cellulose ethers dissolve only in water of about room temperature or below, while they are insoluble in hot water. Examples of such ethers include methylcellulose, ethylcellulose and some mixed ethers containing either or both of these groups. As examples of such mixed ethers which are insoluble in hot water, ethyl-hydroxyethylcellulose containing 13% of ethylene oxide and 25% of ethoxyl (degree of substitution 1.3 as regards ethyl and 0.7 as regards hydroxyethyl) and methyl-hydroxyethylcellulose containing 4% of ethylene oxide and 21% of methyl (degree of substitution 1.2 as regards methyl and 0.2 as regards hydroxyethyl) may be mentioned.

Cellulose ethers of the above-mentioned types are well-known, as pointed out above. Methods of preparing them are described in the technical literature and many patents and will not be explained in detail here, since this invention is only concerned with a method of treating the cellulose ethers after their preparation.

The treatment according to this invention can be carried out with the cellulose ether dissolved in a solvent therefor, i. e. in water or in dilute aqueous alkali, or with the cellulose ether in the solid state, although in most cases more or less swollen.

In the former case the substance to be treated and the borohydride used may be dissolved separately in the solvent and the resulting solutions may be brought together in any suitable manner. It is also possible to dissolve one of the reactants in a previously prepared solution of the other reactant. Since the rate of decomposition of borohydride in water varies considerably with the pH of the solution, it will often be found preferable to use buffered solutions, preferably having a pH of 7 or above. In accordance with the desired application of the substance, the resulting solution may be used as such or the substance may be isolated as a solid, e. g. by acidification, salting-out, evaporation or addition of a water-miscible organic substance which is a non-solvent for the cellulose ether used.

Treatment of the cellulose ether in the solid state may be effected in two different ways. In one case the substance to be treated is suspended in a liquid in which the borohydride used is completely or at least partly soluble but which does not dissolve the cellulose ether. The liquid forms a continuous phase of the suspension and facilitates the contact of the borohydride with the substance to be treated. Examples of organic solvents which are operative are alcohols, such as methanol, ethanol, isopropanol, and further alkyl amines, ethylene diamine, pyridine, morpholine, dioxane, tetrahydrofuran, diethyleneglycol dimethyl ether, triethyleneglycol dimethyl ether.

For reasons of economy it is generally desirable to use water as a suspension medium in cases where it is possible. Two groups of cellulose ethers are particularly well suited for treatment in this manner; cellulose ethers which are soluble only in aqueous alkali and those which are soluble in cold water but not in hot water. That these substances swell in water and in hot water respectively is no disadvantage; on the contrary the contact with the dissolved borohydride will thereby be facilitated. After finished treatment the substances may easily be washed free from by-products formed in the reaction (sodium borate). Examples of cellulose ethers which dissolve only in aqueous alkali, are low-substituted cellulose ethers of the various types referred to above. Examples of cellulose ethers which are insoluble in cold but soluble in hot water are given above.

When treating cellulose ethers in the solid state in the second manner, so small an amount of borohydride solution is used that it may be absorbed by the solid cellulose ether without the cellulose ether appreciably losing its solid structure. An advantage of this method is that it is possible to use water as a solvent for the borohydride even when treating such cellulose ethers as are soluble in pure water, whether cold or hot. Many cellulose ethers may in moist air take up water to 20–30% of their dry weight. Experience shows that certain cellulose ethers may hold a water content of 100% of their dry weight without losing their fibrous structure. By choosing as the starting material a dry or substantially dry product it is possible in this manner to add considerable quantities of borohydride. Of course, the treatment may be repeated if desired. A disadvantage of this type of treatment is that the borate formed as a by-product cannot be removed by washing.

The amount of borohydride to be used depends primarily on the effect desired. In many cases, a noticeable effect may be obtained with an amount of borohydride as small as about 0.001% of the weight of the cellulose ether treated. Preferably, however, at least about 0.01% and more preferably about 0.1% will be used, based on the weight of cellulose ether treated. The upper limit to the amount of borohydride is determined only by economic considerations, and the amount will generally be below 20% of the cellulose ether treated. Since furthermore the effect obtained will generally not increase appreciably with increasing addition of borohydride above a certain limit, it is preferred to use not above 5% and particularly not above 2% by weight, based on the cellulose ether.

The treatment according to this invention may according to circumstances be carried out at, below or above room temperature, e. g. within the range of 0–100° C.

The invention is illustrated but not limited by the following examples:

*Example 1*

Ethyl-hydroxyethylcellulose having a degree of substitution of 0.8 as regards ethyl and 0.7 as regards hydroxyethyl was treated with sodium borohydride in the following manner: 50 g. of the ether were slurried in 450 g. of water at 95° C. 1 g. of sodium borohydride was added to a 10% aqueous solution during 2 hours and with stirring, whereupon the cellulose ether was separated from the water, washed with hot water and dried at 70° C. A control was made by treating an equal quantity of the same cellulose ether in the same manner, but without sodium borohydride, i. e. pure water was added instead of the solution of borohydride. Viscosity measurements were made on samples of the two treated portions of cellulose ether as well as on a sample of the original cellulose ether. The measurements were made in a 2% aqueous solution at 20° C. in a Brookfield viscometer. The values obtained were 2580 centipoise for the sample treated with sodium borohydride, 2640 centipoise for the control and 2290 centipoise for the sample of untreated cellulose ether.

Portions of the ethyl-hydroxyethylcellulose treated as above and a portion of the untreated ethyl-hydroxyethylcellulose were stored in dry condition for 24 hours at 120° C. On samples of the materials stored in this manner the viscosity was determined in the same manner as described above, and the following values were obtained: 2320 centipoise for the sample treated with sodium borohydride, 2000 centipoise for the control and 1620 centipoise for the sample of the untreated cellulose ether. Thus, the ethyl-hydroxyethylcellulose treated with sodium borohydride showed less decrease in viscosity than either the control or the untreated ethyl-hydroxyethylcellulose.

From portions of the ethyl-hydroxyethylcellulose treated as described in the first paragraph and from a portion of the original ethyl-hydroxyethyl cellulose, there were prepared 2% solutions in 1% aqueous caustic soda. The viscosities of the solutions were measured immediately at 20° C. in a Brookfield viscometer and the following results were obtained: 426 centipoise for the cellulose ether treated with borohydride, 393 centipoise for the control and 320 centipoise for the untreated cellulose ether. The solutions were stored for 7 days at 40° C., whereupon viscosity measurements were carried out in the same manner. The values obtained were 201 centipoises, 143 centipoises and 123 centipoises respectively.

When the above experiment was repeated using equal amounts of potassium borohydride instead of sodium borohydride, substantially similar results were obtained.

*Example 2*

Ethyl-hydroxyethylcellulose of the same type as in Example 1 was treated with sodium borohydride in the same manner as in Example 1, but with varying amounts of sodium borohydride. The series of experiments comprised tests with 2%, 0.1%, 0.01%, 0.001% and 0% of sodium borohydride, based on the weight of ethyl-hydroxyethylcellulose.

Each portion was stored for 28 hours at 120° C. 2% aqueous solutions were prepared from samples of the various portions before and after storage at 120° C. The viscosities of the solutions were measured according to Brookfield at 20° C. The results are tabulated below.

| NaBH$_4$, percent | Viscosity, cp. | | Decrease in viscosity, percent |
|---|---|---|---|
| | Dried product | Product stored 28 hrs. at 120° C. | |
| 2 | 3,460 | 2,770 | 20.0 |
| 0.1 | 3,490 | 2,620 | 24.9 |
| 0.01 | 3,510 | 2,240 | 36.2 |
| 0.001 | 3,540 | 2,090 | 41.0 |
| 0 | 3,290 | 1,640 | 50.2 |

Example 3

Methylcellulose having a degree of substitution of 1.6, methyl-hydroxyethylcellulose having a degree of substitution of 1.2 as regards methyl and 0.2 as regards hydroxyethyl, ethylcellulose having a degree of substitution of 0.75, said ethers having viscosities of 3150 cp. (in water), 3260 cp. (in water) and 285 cp. (in 4% soda lye) respectively, as measured in 2% solutions at 20° C. in a Brookfield viscometer, were treated with sodium borohydride in the following manner:

50 g. of the product to be treated were slurried in 450 g. of hot water (95° C.) and 0.5 g. of sodium borohydride (1%, based on the weight of the product) dissolved in 20 ml. of 0.01 N aqueous sodium hydroxide was added with stirring during a period of 45 minutes. After further reaction for 30 minutes at 95° C. the product was filtered and washed with hot water until neutral. After drying over night at 70° C., the products were ground in a Raymond mill.

Of each product a control sample was treated in the same manner but without sodium borohydride (i. e. no borohydride was dissolved in the sodium hydroxide solution added).

Of each sample a 2% solution in 4% aqueous caustic soda was prepared and the viscosity according to Brookfield at 20° C. was measured first two hours after preparation of the solution and then after storage of the solution at 40° C. for 4 days. The following results were obtained:

| Product | Percent of NaBH₄ | Viscosity, cp. | |
|---|---|---|---|
| | | After 2 hrs. | After 40 days at 40° C. |
| Methylcellulose | 0 | 2,720 | 2,490 |
| Do | 1 | 3,130 | 4,080 |
| Ethylcellulose | 0 | 285 | 136 |
| Do | 1 | 281 | 167 |
| Methyl-hydroxyethylcellulose | 0 | 2,830 | 2,560 |
| Do | 1 | 3,070 | 2,990 |

Example 4

Methyl-hydroxypropylcellulose containing 5.9% of propylene oxide and 26.5% of methoxyl and having a viscosity of 2260 cp. measured at 20° C. in a 2% solution in a Brookfield viscometer, was dissolved in water to form a 3% solution. A solution of sodium borohydride in 0.01 N aqueous caustic soda in an amount corresponding to 1% of sodium borohydride based on the cellulose ether was added with stirring during 45 minutes at 50° C. After 1 hour and 15 minutes more at 50° C. the solution was neutralized with 20% acetic acid against phenolphthalein. The solution was evaporated on a glass plate to a film at room temperature. A control sample was treated in the same manner, but without sodium borohydride.

2% solutions in 4% caustic soda were prepared from the samples and the viscosity of the solutions measured first 2 hours after preparation of the solution and then after storage of the solutions for 3 days at 40° C. The following results were obtained.

| Product | Percent of NaBH₄ | Viscosity, cp. | |
|---|---|---|---|
| | | After 2 hrs. | After 3 days at 40° C. |
| Methyl-hydroxypropylcellulose | 0 | 1,400 | 950 |
| Do | 1 | 1,410 | 1,410 |

Example 5

In a series of experiments, the following products were treated with sodium borohydride:

Carboxymethylcellulose, Na salt; $\eta=475$; D. S.$=0.85$
Carboxyethylcellulose, Na salt; $\eta=530$; D. S.$=0.75$
Sulfomethylcellulose, Na salt; $\eta=915$; D. S.$=0.3$
(D. S.$=$degree of subsitution; $\eta=$viscosity in centipoise at 20° C., 2% aqueous solution, Brookfield viscometer.)

Each product was slurried in 75% aqueous ethanol to a concentration of 6%. Sodium borohydride dissolved in 0.01 N caustic soda was added in an amount to give 1% of sodium borohydride based on the weight of the product treated with stirring at 50° C. during 45 minutes. After a further 75 minutes of stirring at 50° C., the product was filtered, washed with 75% aqueous ethanol and dried over night at 70° C. A control sample of each product was treated in the same manner, but without sodium borohydride.

From each sample a 2% solution in 2% aqueous caustic soda was prepared and the viscosity of the solution was measured at 20° C. in Brookfield viscometer first 2 hours after preparation of the solution, and then after storage of the solution at 40° C. for 4 days and 9 days. The following results were obtained:

| Product | Percent of NaBH₄ | After 2 hrs. | Viscosity, cp. | |
|---|---|---|---|---|
| | | | After 4 days at 40° C. | After 9 days at 40° C. |
| Carboxymethylcellulose | 0 | 90.3 | 81 | 67.0 |
| Do | 1 | 102 | 100 | 87.1 |
| Carboxyethylcellulose | 0 | 95 | 86 | 60.0 |
| Do | 1 | 104 | 100 | 93.1 |
| Sulfomethylcellulose | 0 | 10.9 | 11.1 | 11.5 |
| Do | 1 | 11.5 | 12.0 | 12.5 |

Example 6

Hydroxyethylcellulose with a degree of substitution of 1.45 and a viscosity in 2% aqueous solution of 300 cp. when measured with a Brookfield viscometer at 20° C., was dissolved in water to 5% concentration. The solution was stirred efficiently and a solution of sodium borohydride in 0.01 N sodium hydroxide added during 55 minutes at a temperature of 30° C. After stirring slowly for 3 hours at a temperature of 50° C., the solution was neutralized with dilute (20%) acetic acid against phenolphthalein. The amount of sodium borohydride added was 1% calculated on the cellulose ether.

A portion of the solution was poured on a glass plate and dried at room temperature. The film obtained was heated to 120° C. during 16 hours and showed only an insignificant discoloration. The film was easily soluble in water after the heat treatment.

The heating experiment was repeated with the original hydroxyethylcellulose and with hydroxyethylcellulose which had undergone the treatment described above but without any addition of sodium borohydride. In both cases the heated film had a distinct brown color and was only partly soluble in water.

I claim:

1. A method of treating a water-soluble cellulose ether, which comprises reacting said cellulose ether with an alkali metal borohydride.

2. A method as in claim 1, in which said alkali metal borohydride is sodium borohydride.

3. A method as in claim 1, in which said alkali metal borohydride is dissolved in a solvent therefor.

4. A method of treating a cellulose ether which is soluble in cold water, but insoluble in hot water, which comprises reacting said cellulose ether with an aqueous solution of an alkali metal borohydride at a temperature above that at which said cellulose ether becomes insoluble in water.

5. A method as in claim 4, in which said alkali metal borohydride is sodium borohydride.

6. A method as in claim 4 in which said cellulose ether is ethyl-hydroxyethylcellulose.

7. A method of improving the stability of a water-soluble cellulose ether which comprises reacting said cellulose ether with 0.001 to 20% of an alkali metal borohydride based on the weight of said cellulose ether.

8. A method as in claim 7, in which the amount of alkali metal borohydride is within the range of 0.01 to 5% based on the weight of said cellulose ether.

9. A method as in claim 7, in which the amount of alkali metal borohydride is within the range of 0.1 to 2% based on the weight of said cellulose ether.

No references cited.